US010819760B2

(12) United States Patent
Wang et al.

(10) Patent No.: US 10,819,760 B2
(45) Date of Patent: Oct. 27, 2020

(54) METHOD AND APPARATUS FOR STREAMING VIDEO APPLICATIONS IN CELLULAR NETWORKS

(71) Applicants: AT&T Intellectual Property I, L.P., Atlanta, GA (US); University of Southern California, Los Angeles, CA (US)

(72) Inventors: Jia Wang, Basking Ridge, NJ (US); Nemmara Shankaranarayanan, Bridgewater, NJ (US); Ajay Mahimkar, Edison, NJ (US); Xing Xu, Seattle, WA (US); Ramesh Govindan, Cerritos, CA (US)

(73) Assignees: AT&T Intellectual Property I, L.P., Atlanta, GA (US); University of South Carolina, Los Angeles, CA (US)

(*) Notice: Subject to any disclaimer, the term of this patent is extended or adjusted under 35 U.S.C. 154(b) by 68 days.

(21) Appl. No.: 16/148,288

(22) Filed: Oct. 1, 2018

(65) Prior Publication Data
US 2020/0106815 A1    Apr. 2, 2020

(51) Int. Cl.
*H04L 29/06* (2006.01)
*G06Q 50/00* (2012.01)
(Continued)

(52) U.S. Cl.
CPC ......... *H04L 65/4069* (2013.01); *G06Q 50/01* (2013.01); *H04L 65/604* (2013.01); *H04W 24/08* (2013.01); *H04W 84/042* (2013.01)

(58) Field of Classification Search
None
See application file for complete search history.

(56) References Cited

U.S. PATENT DOCUMENTS 6,470,378 B1 * 10/2002 Tracton ................... H04L 29/06
                                                       709/203
9,042,441 B2    5/2015 Shaw et al.
(Continued)

OTHER PUBLICATIONS

Technical Note TN2224: Best Practices for Creating and Deploying HTTP Live Streaming Media for the iPhone and iPad. Available at https://developer.apple.com/library/ios/technotes/tn2224/_index.html. available at least as of May 22, 2018, 18 pages.
(Continued)

*Primary Examiner* — Cai Y Chen
(74) *Attorney, Agent, or Firm* — Guntin & Gust, PLC; Mark Wilinski

(57) ABSTRACT

Aspects of the subject disclosure may include, for example, allocating, by a processing system including a processor, a first subset of resources to a first plurality of applications and a second subset of the resources to a second plurality of applications, wherein the allocating is based on respective statuses associated with the first plurality of applications and the second plurality of applications, and assigning, by the processing system, a respective bitrate to each application of the first plurality of applications, wherein the assigning of the respective bitrate to each application of the first plurality of applications is based on: a first threshold associated with a re-buffering of content, and a second threshold associated with the statuses. Other embodiments are disclosed.

20 Claims, 13 Drawing Sheets

(51) Int. Cl.
  *H04W 24/08*  (2009.01)
  *H04W 84/04*  (2009.01)

(56) References Cited

U.S. PATENT DOCUMENTS

| | | | |
|---|---|---|---|
| 9,264,942 | B2 | 2/2016 | Sarkar et al. |
| 9,295,064 | B2 | 3/2016 | Chen et al. |
| 9,456,387 | B2 | 9/2016 | Viswanathan et al. |
| 9,603,047 | B2 | 3/2017 | Sridhar et al. |
| 9,867,069 | B2 | 1/2018 | Brännström et al. |
| 10,009,241 | B1 | 6/2018 | Ganjam et al. |
| 2009/0022060 | A1* | 1/2009 | Langille .............. H04L 41/0896 370/252 |
| 2011/0179185 | A1 | 7/2011 | Wang et al. |
| 2013/0065562 | A1* | 3/2013 | Singh .................. G06F 3/04842 455/414.1 |
| 2016/0219320 | A1* | 7/2016 | Hain ................ H04N 21/23655 |
| 2017/0070554 | A1* | 3/2017 | Mayrand ............ H04L 65/4069 |
| 2018/0014222 | A1 | 1/2018 | Song et al. |
| 2018/0027293 | A1 | 1/2018 | Yamamoto et al. |
| 2018/0219932 | A1 | 8/2018 | Natarajan et al. |
| 2018/0309809 | A1* | 10/2018 | Sen .................. H04N 21/23439 |

OTHER PUBLICATIONS

3rd Generation Partnership Project, TS 36.213 V9.2.0, Jun. 2010, 63 pages.
"Multimedia over IP and Wireless Networks: Compression, Networking, and Systems", Mar. 16, 2007, Abstract.
"Ns-3", Available at https://www.nsnam.org/. Accessed Aug. 15, 2018, 2 pages.
Akhshabi, et al., "Server-based traffic shaping for stabilizing oscillating adaptive streaming players", 2013, 8 pages.
Andrews, et al., "CDMA data QoS scheduling on the forward link with variable channel conditions.", Apr. 2000, 45 pages.
Andrews, et al., "Providing quality of service over a shared wireless link.", Feb. 2001, 5 pages.
Balachandran, et al., "Developing a predictive model of quality of experience for internet video", 2013, 12 pages.
Bu, et al., "Generalized Proportional Fair Scheduling in Third Generation Wireless Data Networks", 2006, 12 pages.
Chau, et al., "Economic viability of Paris metro pricing for digital services", Oct. 2014, 14 pages.
Chen, et al., "A Scheduling Framework for Adaptive Video Delivery over Cellular Networks", 2013, 12 pages.
Chen, et al., "QAVA: Quota Aware Video Adaptation", 2012, 12 pages.
Dahlman, et al., "3G Evolution HSPA and LTE for Mobile Broadband", 2008, 26 pages.
Eryilmaz, et al., "Fair Resource Allocation in Wireless Networks using Queue-length-based Scheduling and Congestion Control", Dec. 2007, 12 pages.
Ganjam, et al., "C3: Internet-Scale Control Plane for Video Quality Optimization", May 2015, 15 pages.
Ghosh, et al., "Fundamentals of LTE", 2010, Abstract.
Ha, et al., "Tube: Time-dependent pricing for mobile data", 2012, 12 pages.
Huang, et al., "A Buffer-Based Approach to Rate Adaptation: Evidence from a Large Video Streaming Service", 2014, 14 pages.
Huang, et al., "Confused, Timid, and Unstable: Picking a Video Streaming Rate is Hard", 2012, 14 pages.
Jain, et al., "Mobile Throughput Guidance Inband Signaling Protocol", Mar. 13, 2017, 16 pages.
Jain, et al., "Throughput Fairness Index: An Explanation", 1999, 9 pages.
Jalali, et al., "Data Throughput of CDMA-HDR a High Efficiency-High Data Rate Personal Communication Wireless System", 2000, 5 pages.
Jiang, et al., "CFA: A Practical Prediction System for Video QoE Optimization", Mar. 2016, 14 pages.
Jiang, et al., "Improving Fairness, Efficiency, and Stability in HTTP-based Adaptive Video Streaming with FESTIVE", 2012, 12 pages.
Khan, et al., "Opportunistic Proportional Fair Downlink Scheduling for Scalable Video Transmission over LTE Systems", Sep. 2013, 6 pages.
Khawam, et al., "The Weighted Proportional Fair Scheduler", 2006, 9 pages.
Kokku, et al., "CellSlice: Cellular Wireless Resource Slicing for Active RAN Sharing", 2013, 10 pages.
Kokku, et al., "NVS: A Substrate for Virtualizing Wireless Resources in Cellular Networks", 2012, 14 pages.
Lakshman, et al., "Vbr video: tradeoffs and potentials", May 1998, 55 pages.
Lee, et al., "Proportional Fair Frequency-Domain Packet Scheduling for 3GPP LTE Uplink", Apr. 2009, 9 pages.
Liu, et al., "QoS-driven and Fair Downlink Scheduling for Video Streaming over LTE Networks with Deadline and Hard Hand-off", 2012, 6 pages.
Lu, et al., "CQIC: Revisiting Cross-Layer Congestion Control for Cellular Networks", 2015, 6 pages.
Luo, et al., "Quality-Driven Cross-Layer Optimized Video Delivery over LTE", Feb. 2010, 8 pages.
Odlyzko, et al., "Paris Metro Pricing for the Internet", 1999, 8 pages.
Parsons, et al., "The mobile radio propagation channel", 1992, 21 pages.
Piro, et al., "An LTE module for the ns-3 network simulator", 2011, 8 pages.
Ramli, et al., "Performance of Well Known Packet Scheduling Algorithms in the Downlink 3GPP LTE System", Dec. 2009, 6 pages.
Rhee, et al., "cheduling of Real/Nonreal Time Services in an AMC/TDM System: EXP/PF Algorithm", 2003, 5 pages.
Shakkottai, et al., "Scheduling algorithms for a mixture of real-time and non-real-time data in hdr", 2001, 12 pages.
Spiteri, et al., "BOLA: near-optimal bitrate adaptation for online videos", 2016, 12 pages.
Stolyar, et al., "Largest Weighted Delay First Scheduling: Large Deviations and Optimality", 2001, 48 pages.
Tsybakov, Boris , "File Transmission Over Wireless Fast Fading Downlink", Aug. 2002, 15 pages.
Vleeschauwer, et al., "Optimization of HTTP Adaptive Streaming Over Mobile Cellular Networks", Apr. 2013, 9 pages.
Xian, et al., "Analysis of M-LWDF fairness and an enhanced M-LWDF packet scheduling mechanism", 2011, 7 pages.
Yin, et al., "A Control-Theoretic Approach for Dynamic Adaptive Video Streaming over HTTP", 2015, 14 pages.

* cited by examiner

Data: $T$ = number of total PRBs; $p$ = percentage of total PRBs that can be allocated to premium applications; $S$ = number of premium applications; $r_i$ = channel condition of each application $A_i$ in terms of achievable rate per PRB ($i \in [1..S]$).

Result: Selected bitrate $x_i$ for each application $A_i$.

/* Map to a bitrate candidate (Figure 3) */
1  $PRB_{premium} = 0$;
2  for $i \in [1..S]$ do
   /* Assign bitrate by fair share: $\frac{pT}{S}$ */
3     $x_i = \text{ClosestBitrateCandidate}(r_i \times \frac{pT}{S})$;
4     $PRB_{premium} = PRB_{premium} + \frac{x_i}{r_i}$;

/* Downgrade to use no more than $pT$ PRBs */
5  $x = \text{Sort}(A)$ /* Sort applications in ascending order of channel condition $r_i$ */
6  while $PRB_{premium} > pT$ do
7     for $i \in [1..S]$ do
8        if $x_i \geq R_{i,rb}$ then
9           $PRB_{premium} = \text{DowngradeOneLevel}(x_i, PRB_{premium})$;
10          break;

11 while $PRB_{premium} > pT$ do
12    for $i \in [1..S]$ do
13       if $x_i \geq R_{i,1}$ then
14          $PRB_{premium} = \text{DowngradeOneLevel}(x_i, PRB_{premium})$;
15          break;

16 while $PRB_{premium} > pT$ do
17    for $i \in [1..S]$ do
18       $PRB_{premium} = \text{DowngradeToNonPremium}(x_i, PRB_{premium})$;
         break;

1 Function *Update-Weight()*
   Data: $T$ = total number of PRBs, $N$ = number of applications, $V$ = target throughput for the premium application, $I_{MCS}$ = channel condition, $Q(\cdot)$ = number of PRBs for non-backlogged applications
   Result: $W$ = weight for the premium application
2  $T' = T$, $N' = N$;
3  while $N'$ *has not converged* do
4      $F = \frac{T'}{N'}$;
5      for $x \in AllApplications$ do
6        if $y$ *is not non-backlogged and* $Q(y) < F$ then /* Non-backlogged */
7           Label $y$ as non-backlogged application;
8           $T' = T' - Q(y)$;
9           $N' = N' - 1$;

/* Calculate weight. */
10 $P = \frac{V}{f(I_{MCS})}$; $W = \frac{P(N'-1)}{(T'-P)}$;

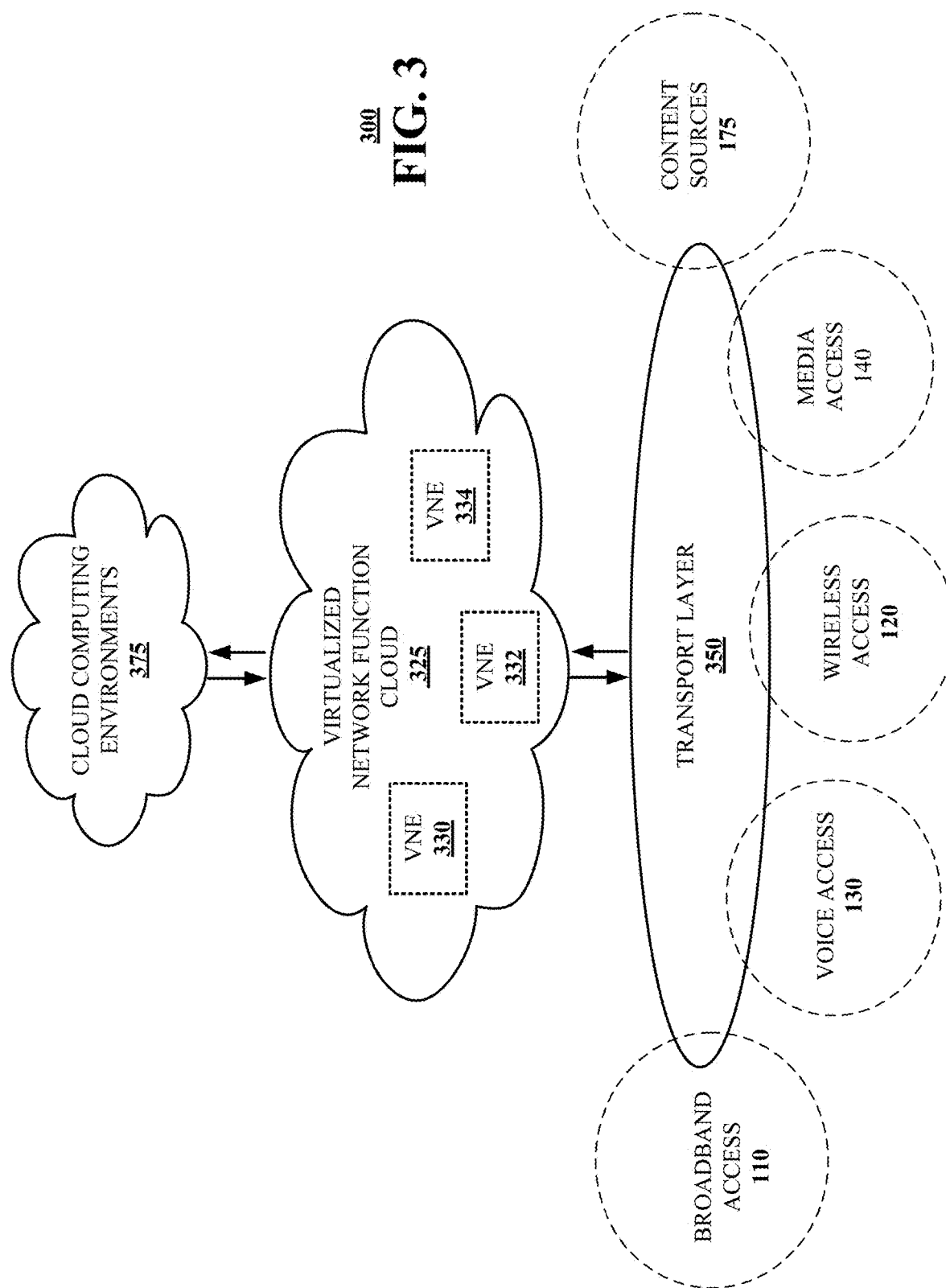

600

METHOD AND APPARATUS FOR STREAMING VIDEO APPLICATIONS IN CELLULAR NETWORKS

STATEMENT REGARDING FEDERALLY SPONSORED RESEACH OR DEVELOPMENT

This invention was made with government support under CNS-1413978 awarded by the National Science Foundation. The government has certain rights in the invention.

FIELD OF THE DISCLOSURE

The subject disclosure relates to a provisioning of content in one or more networks, inclusive of methods, apparatuses, and system for streaming video applications in cellular networks.

BACKGROUND

Streaming video applications require high bandwidth to facilitate a high quality of experience (QoE) from a user and/or network perspective. With the proliferation of user devices and data-rich applications, network/service providers/operators have been presented with challenges in terms of a provisioning of content with a limited set of resources. To maintain a high QoE, a network/service operator can deploy additional resources (e.g., can build more base stations or acquire more radio spectrum). However, allocated additional resources are expensive and time-consuming.

BRIEF DESCRIPTION OF THE DRAWINGS

Reference will now be made to the accompanying drawings, which are not necessarily drawn to scale, and wherein:

FIG. 2E depicts an exemplary algorithm for selecting a bitrate in accordance with various aspects described herein.

FIG. 2G depicts an exemplary algorithm for calculating a weight parameter in accordance with various aspects described herein.

FIG. 3 is a block diagram illustrating an example, non-limiting embodiment of a virtualized communication network in accordance with various aspects described herein.

DETAILED DESCRIPTION

The subject disclosure describes, among other things, illustrative embodiments for facilitating a high quality of experience (QoE) in terms of a provisioning of content on one or more networks. In some embodiments, QoE may be specified in terms of one or more tiers/categories/classes of service. For example, in some embodiments, a first (e.g., premium) status may be allocated to a first set of applications and a second (e.g., non-premium) status may be allocated to a second set of applications. Other embodiments are described in the subject disclosure.

One or more aspects of the subject disclosure include selecting one or more bitrates for a given application. In some embodiments, the selection may be based on a first threshold associated with a re-buffering of content, a second threshold associated with a status that differentiates a premium application from a non-premium application, or a combination thereof.

One or more aspects of the subject disclosure include selecting a weight that is applied to a respective application. The weight may represent a respective share of resources included in a subset of resources allocated to the application. The weight may be determined in accordance with one or more of: a total number of resources included in the subset of resources, a total number of applications included in a plurality of applications, a target throughput of the respective application, a channel condition associated with the respective application, and/or an identification of non-backlogged applications included in the plurality of applications. Non-backlogged applications may include those applications that utilize less than their respective fair share of resources.

Aspects of the disclosure may be applied at one or more levels of granularity or abstraction. For example, aspects of the disclosure may be applied in connection with one or more applications. Without loss of generality, aspects of the disclosure may be application in connection with one or more users (e.g., subscribers or customers), one or more components or devices (e.g., one or more user/client device), etc.

Figure 1:
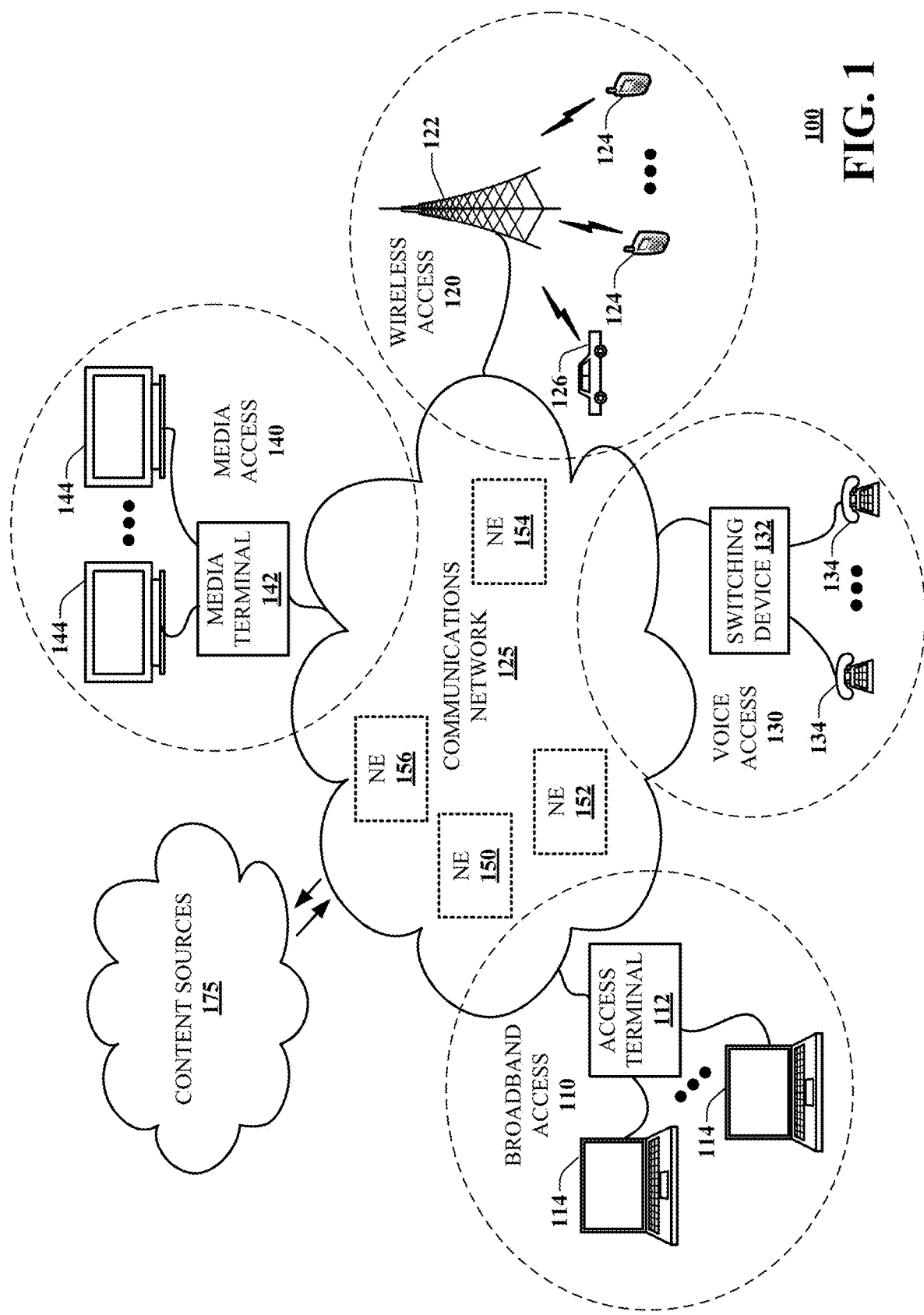
FIG. 1 is a block diagram illustrating an example, non-limiting embodiment of a communications network in accordance with various aspects described herein.

Referring now to FIG. 1, a block diagram is shown illustrating an example, non-limiting embodiment of a communications network 100 in accordance with various aspects described herein. For example, communications network 100 can facilitate, in whole or in part, designating a first plurality of applications with a first status (e.g., a premium status) and a second plurality of applications with a second status (e.g., a non-premium status) that is different from the first status. The communications network 100 can facilitate, in whole or in part, allocating a first subset of resources to the first plurality of applications and a second subset of the resources to the second plurality of applications. The communications network 100 can facilitate, in whole or in part, selecting, by the processing system, a respective bitrate for each application of the first plurality of applications or each application of the second plurality of applications. The selected bitrate may be based on a first threshold associated with a re-buffering of content, a second threshold associated with a status that differentiates the premium applications from the non-premium applications, or a combination thereof. The communications network 100 can facilitate, in whole or in part, determining a weight to be applied to each application. For example, a weight may be applied to each application of the first plurality of applications such that each application is allocated a respective share of resources included in the first subset of resources. The weight may be based on a total number of resources included in the first subset of resources, a total number of applications included in the first plurality of applications, a target throughput of the application, a channel condition associated with the application, an identification of non-backlogged applications included in the first plurality of applications.

A communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

The communication network of FIG. 1 may facilitate a provisioning of content (e.g., streaming video) in accordance with various aspects described herein. Streaming video applications may require high bandwidth (e.g., bandwidth above a threshold) to obtain a desired/predetermined quality of experience (QoE). For example, streaming video applications are driving rapid growth of mobile data traffic in cellular networks. Some cellular networks may provide best-effort services to some (e.g., most) user data applications. When there is congestion at a base station, streaming video applications may experience degraded QoE. Aspects of this disclosure may be reviewed from a service/operator provider's perspective in conjunction with a provisioning of premium service/status for improving QoE of streaming video applications.

In some embodiments, a network adaptation scheme (referred to herein as "SHADE" for reasons that will become clearer below) is provided that intelligently allocates finite resources (e.g., transmission resources) at, e.g., a base station among applications, by (i) selecting a bitrate from a set of candidate bitrates for each streaming video application and (ii) maintaining a downlink throughput at the selected bitrate for better QoE, while still using a non-guaranteed bit rate (NGBR) traffic class which is suitable for high bit-rate streaming video. SHADE can achieve this with high network utilization and improve QoE for streaming video applications, and with bounded negative performance impact to other applications. Research/experimentation has shown that SHADE can significantly improve multiple streaming video application QoE metrics simultaneously (up to 10 times improvement) compared to current/conventional practice. Carriers (e.g., cellular carriers) and equipment vendors can adopt SHADE without major changes to current network implementations/platforms/topologies. Implementation of SHADE can improve the QoE of streaming video applications for devices and applications.

Networks (e.g., cellular networks) may provide different quality of service (QoS) classes for traffic flows over the radio access network. For example, 4G LTE networks have guaranteed bitrate (GBR) classes of traffic which guarantee radio resources, and these classes are used for real-time applications such as Voice over LTE with low to moderate bitrate needs. The bulk of Internet Protocol (IP) data, such as video and web content, may tend to traverse network resources as bursts (e.g., a high quantity of data over a relatively short time frame) with high bit-rate requirements. Such data bursts may be suitable for a NGBR class of service which does not have a specific bit rate guarantee. Using such a NGBR/best-effort service, application throughput can decrease during periods of network congestion, which may occur when total user traffic demand exceeds resource capacity (e.g., base station capacity). However, and as discussed above, mobile traffic is growing rapidly and is driven by streaming video applications for which users need a good and consistent QoE. Any decrease in QoE may lead to a reduction in user engagement, and consequently, a reduction in revenue or profit for a network/service operator.

While some streaming video content systems have been designed to adapt to changing throughput, network conditions tend to be dynamic in nature and pose unique challenges. The increase in the use/availability of panoramic content, such as for example 360-degree videos, tends to impose even more stringent QoE requirements. Therefore, there is a significant need for better solutions for providing high-levels of QoE to streaming video applications in networks; aspects of this disclosure are directed to addressing such a need.

One option to address the need for providing high QoE is for the operators to increase capacity by allocating/building more infrastructure (e.g., base stations) or acquiring more radio spectrum; but these solutions are expensive and also require significant time to deploy. Other options are to provide throughput guidance feedback from the network to the end users/devices for better user/client adaptation. However, such adaptation tends to be costly from the perspective of user/client device resources.

To manage limited transmission resources, current/conventional cellular systems use schedulers in a base station to allocate resources among applications in a fair and efficient manner. In accordance with aspects of this disclosure, a handling of a set of premium adaptive video streaming flows may be based on a differentiated service model. For example, in accordance with aspects of this disclosure a network may be made "content-aware", whereby the network infrastructure may know which application flows are premium (and which application flows are regular/non-premium), and also know a set of predetermined, suitable bitrate candidates for each adaptive video application. As described above, such adaptation of content flows may be referred to herein as conforming to a "SHADE" implementation, which Stabilizes throughput at a relatively High downlink bitrate to provide enhanced ADaptive streaming video applications with good quality of Experience.

In accordance with aspects of this disclosure, a network is capable of adapting its resources to provide a relatively better QoE for adaptive bit rate applications such as video streaming. Since network throughput conditions can vary significantly due to radio conditions and network load, aspects of this disclosure take an approach of creating a differentiated group of premium adaptive video application flows which are managed for consistent QoE. Admission to this premium group/class may be controlled. With such an admission-controlled group, the network may have a greater ability to manage applications requiring a high level of QoE while reducing (e g , minimizing) any negative impact to regular/non-premium applications. Aspects of this disclosure incorporate a pragmatic approach to facilitate ease in implementation/deployment, thereby providing opportunities for building upon widely deployed NGBR schedulers.

In many conventional adaptive video streaming applications, content is divided into chunks. Each chunk may contain several seconds of the original content. The chunks may be encoded at a few different bit rates (quality levels). A user/client-side device/player may monitor current downlink bandwidth, and based on that monitoring, may request the next chunk at a suitable/appropriate bitrate. However, when transmission resources are limited, such as during periods of high network utilization/congestion, arbitrarily increasing application throughput may represent a suboptimal solution. Thus, and in accordance with aspects of this disclosure, by empirically analyzing a relationship between downlink throughput and application QoE, a stable downlink throughput may be maintained at a bitrate selected from one of a plurality of bitrate candidates.

SHADE can improve QoE metrics (e.g., average bitrate, re-buffering ratio, and bitrate switches/modifications) simultaneously for the premium adaptive video applications when compared to other solutions. Compared to previous approaches, experimentation/testing/simulation has shown that SHADE may obtain more than 10 times reduction on both re-buffering ratio and bitrate switches, while also improving the average bitrate by at least 18%.

In accordance with aspects of this disclosure, throughput may be maintained at a bitrate selected from a plurality of bitrate candidates. Maintenance of the bitrate may provide for enhanced QoE as described further below.

In some embodiments, SHADE may include a creation of a set of premium adaptive applications. Such applications may include, or be associated with, a requirement for enhanced and/or consistent QoE.

In some embodiments, SHADE may include a bitrate selection component that selects suitable bit rate levels to meet QoE metrics for premium applications. Simultaneously, SHADE may reduce (e.g., minimize) the negative impact on regular/non-premium applications.

In some embodiments, SHADE may include a throughput maintenance component that maintains each application's downlink throughput at a targeted value using NGBR traffic classes and provide high utilization at the same time, without significant changes/modifications to the widely deployed proportional fair scheduler described below.

Video applications have emerged as a strong driver of growth in network traffic (e.g., mobile data traffic). Adaptive video streaming is a multi-bitrate application that is well suited to having the network assist in selecting and maintaining a given bitrate, and changing the selection if the one or more conditions (e.g., available bandwidth) change substantially. SHADE may change/modify how resources (e.g., transmission resources) are allocated in the network to enable better service for premium adaptive video applications.

Aspects of the disclosure, inclusive of SHADE, may be applied in conjunction with a cellular network. For example, aspects of the disclosure may be applied in connection with the 4G Long-Term Evolution (LTE) cellular technology standard. For the sake of ease in description, aspects of the disclosure are described below in the context of resource sharing in the LTE downlink. Such aspects may be generalized so as to be applied in connection with resource sharing in an uplink direction. Moreover, aspects of the disclosure may be generalized to apply to other technologies, inclusive of other cellular technologies.

In the downlink, LTE may divide radio spectrum resources into orthogonal sub-carriers, each of which may have a bandwidth of 15 kHz. In the time domain, LTE may have frames of 10 ms which are composed of 10 Transmission Time Intervals (TTIs). Each TTI may have two slots of 0.5 ms duration. A set of twelve consecutive sub-carriers over the duration of one slot may be referred to as a Physical Resource Block (PRB). A PRB may be representative of a basic scheduling unit.

A scheduler in an LTE eNodeB base station can assign each PRB to a given user device or application. Each LTE user device may periodically measure a channel condition and provides a Channel Quality Indicator (CQI) report. On a per-user device/application basis, the base station may use the CQI to select a Modulation and Coding Scheme (MCS) used for the radio transmission, with a higher CQI value indicating a higher MCS value which has a higher bitrate and more efficient use of the PRB. The PRB scheduling algorithm may provide good efficiency (throughput to applications) and may be more likely to assign a PRB to an application with a higher CQI/MCS (bitrate). Similarly, the PRB scheduling algorithm may be "fair" in the sense that the algorithm may ensure that applications with a lower CQI/MCS receive/obtain an appropriate share of resources.

Resource schedulers that may be utilized/implemented in accordance with this disclosure may incorporate aspects of a proportional fair (PF) scheduler. A PF scheduler, which is familiar to one skilled in the art, provides a balance between efficiency and fairness. For example, for each PRB and for each application i, a PF scheduler may calculate at least two values. A first value may relate to i's achievable rate when using the PRB (denoted as $R_i$). A second value may relate to i's average date rate over a time interval in the past (denoted as $M_i$). The PRB may be assigned to the application i with the highest value of the metric m in accordance with equation #1 as follows:

$$m=\arg\max(R_i/M_i), \quad \text{equation \#1}$$

where arg is the argument function, and max maximizes the ratio of $R_i$ to $M_i$.

Thus, in accordance with equation #1, the PF scheduler ensures that resources are not wasted. For example, the PF scheduler (in accordance with equation #1) serves to maximize the sum of the log of each user/application rate. Additionally, the PF scheduler may be further modified (e.g., enhanced) by incorporating a weight to the numerator $R_i$ of the argument as described further below.

In LTE networks, each application's profile and subscriber data may be stored in an evolved packet core (EPC), with usage and charging policies stored and implemented by policy elements in the EPC. For each application, provisioning information may be read and communicated to a base station. An access point name (APN) may be used to route data for a set of application flows, and also map to CQI classes in the base station. The EPC may include data to indicate whether an application is a member of a premium class/service for which the network provides a high QoE for adaptive video application flows. The data may include a predetermined set of bitrate levels for an adaptive video application.

Current/conventional video streaming technologies may include HTTP-based adaptive streaming protocols. At a server associated with a client/server communication, video content may be encoded at few different bitrates; e.g., content may be encoded at five to six different bitrates. As described above, each of the bitrate versions may be divided into chunks, where each chunk contains several seconds of the content. Chunks of different bitrates may be aligned so that the client/user device can smoothly switch to a different bitrate at the granularity of a chunk.

At the user/client device, an adaptive bitrate algorithm (ABR) may measure the recent available bandwidth and a buffered playback to determine a suitable bitrate for the next chunk to request. For example, a higher throughput, or a larger playout buffer, may drive the ABR to request chunks with a higher bitrate. Conversely, a lower throughput, or a smaller playout buffer, may drive the ABR to request chunks with a lower bitrate. An assumption may be made that an application's available bandwidth is bottlenecked by the downlink throughput, and thus the chunk rate request can be managed by managing the downlink throughput.

Among several QoE metrics for adaptive video streaming applications, consideration may be provided in connection with average bitrate, re-buffering ratio, and bitrate switches. Average bitrate is the time average of the different bitrates that were used for given content over some time interval. All other things being equal, a higher average bitrate provides better quality. Re-buffering ratio is computed as the ratio of time spent while playout is interrupted (re-buffering) to the time for which playout is smooth. A high re-buffering ratio significantly degrades QoE. Bitrate switches counts the number of quality (bitrate) changes within a time interval. A higher value of bitrate switches tends to be more distractive, and lower values of bitrate switches are preferred.

Figure 2A:
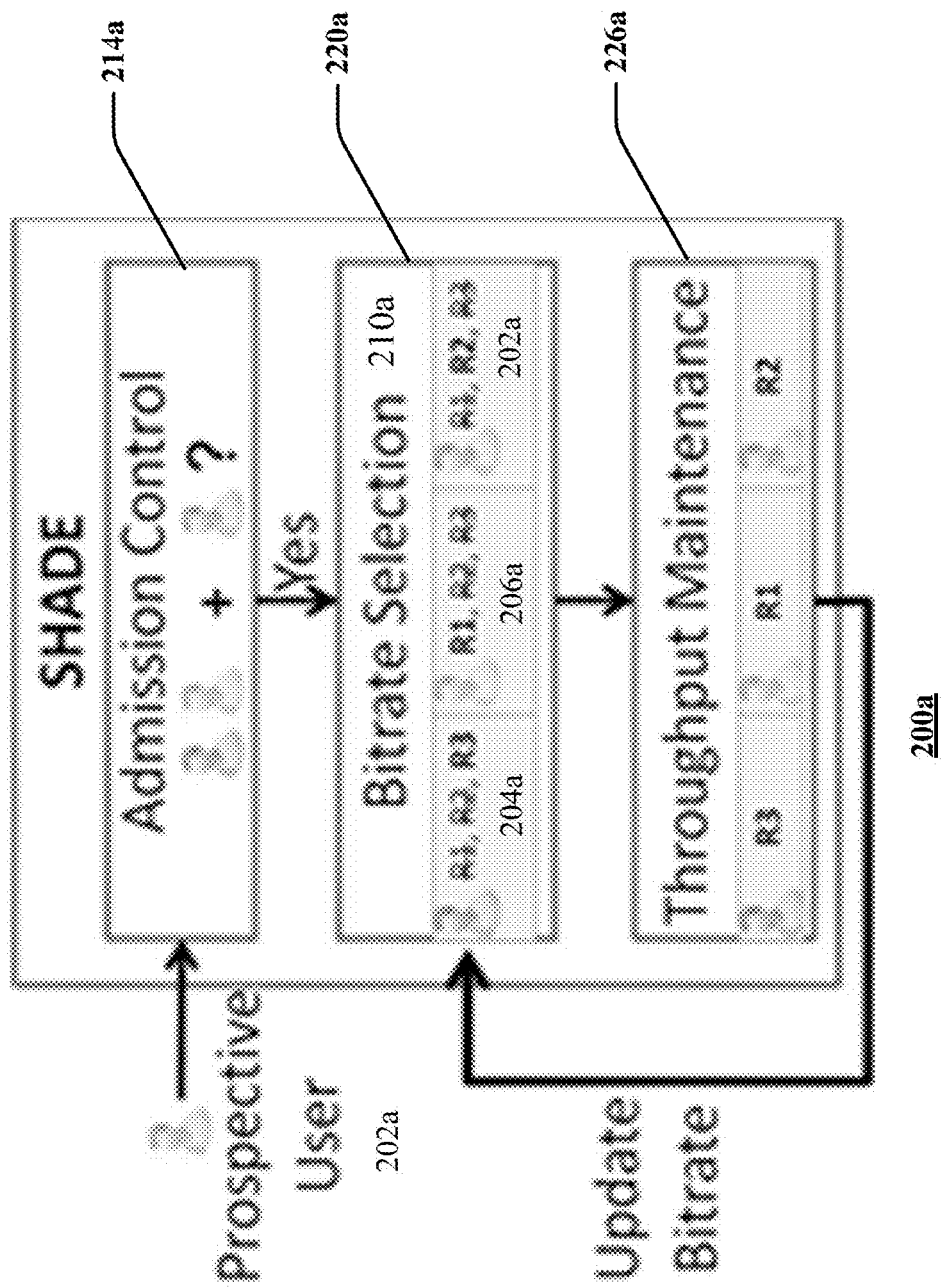
FIG. 2A is a block diagram illustrating an example, non-limiting embodiment of a workflow within the communication network of FIG. 1 in accordance with various aspects described herein.

Referring to FIG. 2A, an illustrative embodiment of a SHADE workflow 200a in accordance with aspects of this disclosure is shown. The workflow 200a may be used to selectively admit a first, prospective application 202a to a premium status/group already composed of a second member 204a and a third member 206a. As described above, premium status may be afforded to those applications that are entitled to a higher level of QoE relative to regular/non-premium status.

The workflow 200a may include an admission control component/mechanism 214a, a bitrate selection component/mechanism 220a, and a throughput maintenance 226a.

The admission control component 214a may control admission to premium status based on available (resource) capacity. In this exemplary embodiment of FIG. 2A, resources are sufficient such that the first application 202a is admitted to premium status.

The bitrate selection component 220a may select a(n initial) bitrate for each application that is to be maintained. For example, as shown in FIG. 2A, bitrates R1-R3 may be available, wherein the bitrate selection component 220a may assign the first application 202a the bitrate R2, the second application 204a the bitrate R3, and the third application 206a the bitrate R1. Bitrates R1-R3 may represent discrete bitrate values or ranges of bitrate values. The bitrates R1-R3 may be at least partially differentiated from one another, and may be completely different from one another.

The throughput maintenance component 226a may maintain the throughput of a premium content (e.g., video) flow for an application at the bitrate selected by the bitrate selection component 220a. In some instances, such as for example due to dynamic conditions/circumstances (e.g., due to changing network conditions, changes in status of applications, etc.), bitrates may be modified/updated as reflected by the flow from the throughput maintenance component 226a to the bitrate selection component 220a.

The aggregate of the components 214a-226a may serve to ensure that resources are available for regular/non-premium applications as conditions change. As described further below, target/selected bitrates for applications may be adjusted as needed.

In accordance with aspects of this disclosure, a set of applications or user/client devices may be provisioned with a capability of requesting and utilizing premium adaptive video streaming applications. For example, an application may request to be managed in accordance with a premium flow/status. An assumption may be made that a set of suitable bitrates is known for each such application. The request may include CQI information, which allows a network resource (e.g., a base station) to estimate the resources (e.g., PRB resources) needed. An admission control component (e.g., the admission control component 214a of FIG. 2A), with knowledge of the current workload, may determine whether a prospective application can be admitted as a premium member. Similarly, the admission control component may determine whether an existing premium member should be relegated/removed from premium status and (re-) allocated as a regular/non-premium member. If an application is admitted as a premium member (e.g., the application is assigned premium status), attempts may be made to maintain the application's downlink throughput at one of the bitrate candidates for selected content.

Selecting a target bitrate for each premium application can prove challenging where the number of resources (e.g., PRBs) is limited. For example, it might not be feasible to select the highest bitrate from a set of candidate bitrates for all flows due to a lack of resources to support the same. Consequently, there are at least two competing criteria that should be satisfied by SHADE. First, in order to bound/limit the negative impact to regular/non-premium applications, a limitation may need to be imposed by SHADE on the aggregate resources that are allocated to premium applications. Second, a mechanism may be needed in SHADE to select a bitrate for each premium application to provide the best QoE to the premium application using the resources that are available.

Moreover, SHADE may need to take into consideration the three QoE metrics discussed above. For example, SHADE may seek to achieve/obtain a high average bitrate, a low re-buffering ratio, and stable bitrate switches simultaneously in order to enhance QoE. It is recognized that improving a first QoE metric (e.g., average bitrate) frequently is accompanied by a penalty/expense in terms of degrading the other two QoE metrics (e.g., re-buffering ratio and bitrate switches).

Furthermore, SHADE may need to adapt to network dynamics, e.g., changes on a user's or application's mobility (e.g., changes in terms of a user/client device location), changes in network requirements, changes in channel conditions (e.g., data traffic) of channels (e.g., communication channels), etc. Such dynamics may result in frequent updates to bitrate selections, thereby imposing further challenges in terms of stabilizing bitrate selections over time. For example, experience has shown that satisfactory QoE performance is dependent on stabilizing selected bitrates over time.

Conventionally, bit rates are maintained by using a reservation based approach (e.g., the guaranteed bitrate [GBR] traffic class provided in LTE). Using this technique to maintain premium application downlink throughput has two associated challenges. First, it is not work-conserving. For example, resources reserved for a first application cannot be used by other applications when the first application does not require the resources. Thus, this approach is not suitable to maintain a high throughput because resources that are reserved but underutilized introduce inefficiencies. Second, a new GBR scheme requires significant changes to network infrastructure (e.g., base stations). To simplify deployment and maintain backwards compatibility with legacy infrastructure, SHADE may be designed to reduce (e.g., minimize) changes to existing/current technology platforms.

As described above, SHADE may build upon the existing and widely-used proportional fair (PF) scheduler. PF scheduling is based on sharing (as opposed to a reservation-based technique), and thus serves as a work-conserving scheduler. By supplementing a conventional PF scheduler, SHADE maintains the high-efficiency properties of the scheduler. For example, and as described above, SHADE may apply a weight (denoted as $W_i$) for an application i in connection with equation #1 above; the application of this weight is denoted by equation #2 as follows:

$$m = \arg \max(W_i * R_i / M_i) \qquad \text{equation \#2}$$

The use of the weight parameter $W_i$ to maintain downlink throughput is described further below. To this point, it suffices to state that a premium application with a weight W is equivalent to W identical regular/non-premium applications with a weight equal to 1. Thus, by applying the weight W, a given application can obtain roughly W times the amount of resources (e.g., PRBs), within other constraints. Then, to maintain downlink throughput, the number of resources may be dynamically adapted to achieve a targeted/selected throughput.

In the description that follows, discussion is provided regarding how SHADE may be used to select bitrates for premium application to obtain good QoE with limited (e.g., minimal) impact on regular/non-premium applications.

Figure 2B:
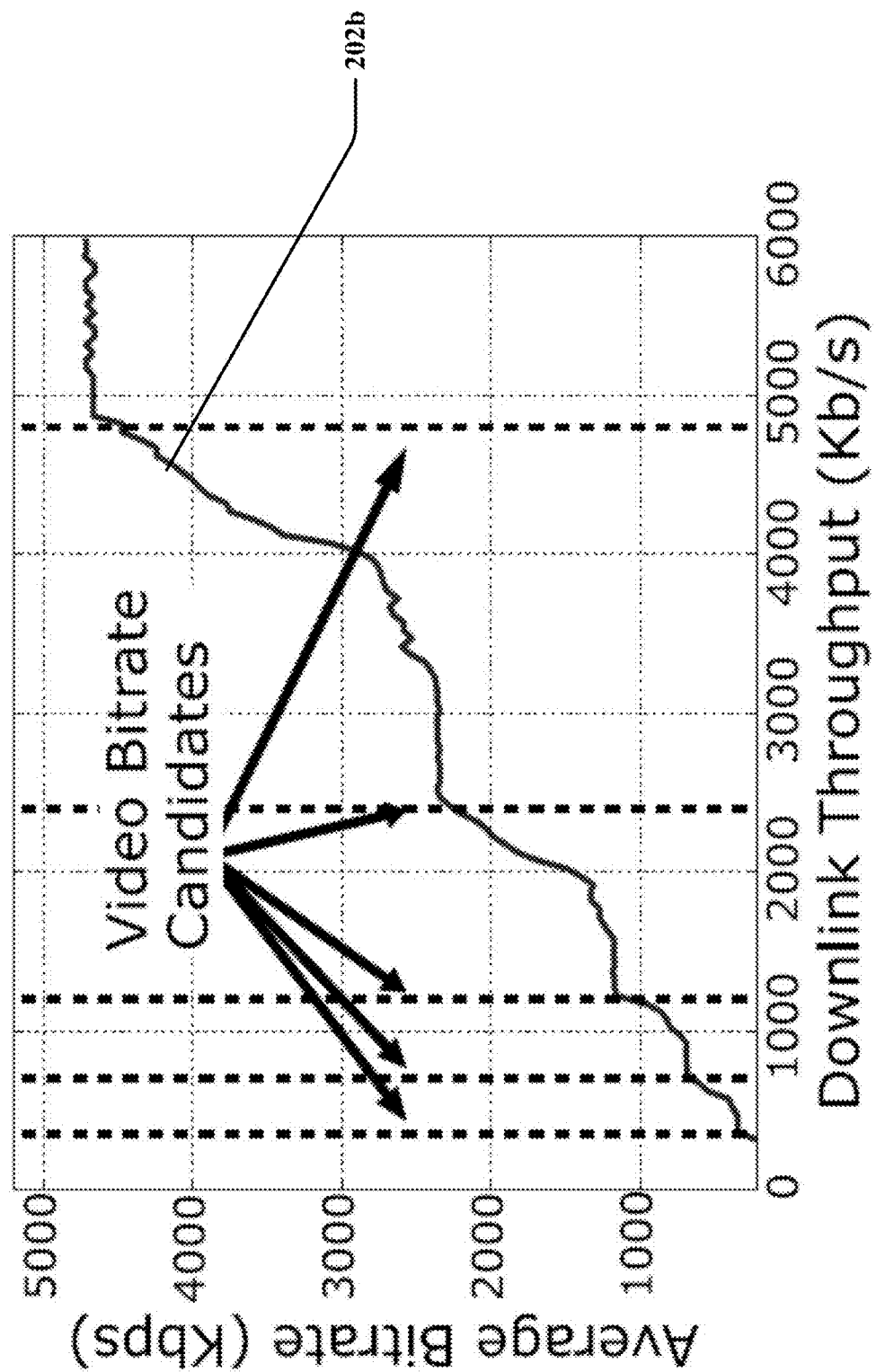
FIG. 2B is an exemplary illustration of a graph of average bitrate as a function of downlink throughput in accordance with various aspects described herein.

In networks (e.g., cellular networks), QoE associated with streaming video applications may be dominated by downlink throughput that user devices obtain via network infrastructure (e.g., a base station). When downlink throughput is limited, video QoE can be poor even with a good ABR algorithm. For example, FIG. 2B (empirically) illustrates that a plot 202b of average bitrate increases as downlink throughput increases. For example, the plot 202b indicates that average bitrate may increase, relative to downlink throughput, in accordance with an approximate step function pattern. For example, downlink throughputs of 2400 Kbps and 3000 Kbps yield similar average bitrates. Thus, in the example of FIG. 2B, if there is insufficient resources to increase downlink throughput to the candidate bitrate coinciding with 4800 Kbps, selecting the candidate bitrate coinciding with 2400 Kbps downlink throughput may be more cost-effective. Furthermore, the re-buffering ratio may decrease as the downlink throughput increases. For example, experience has shown that when the downlink throughput is above 700 Kbps, the re-buffering ratio approaches zero for most content.

Figure 2C:
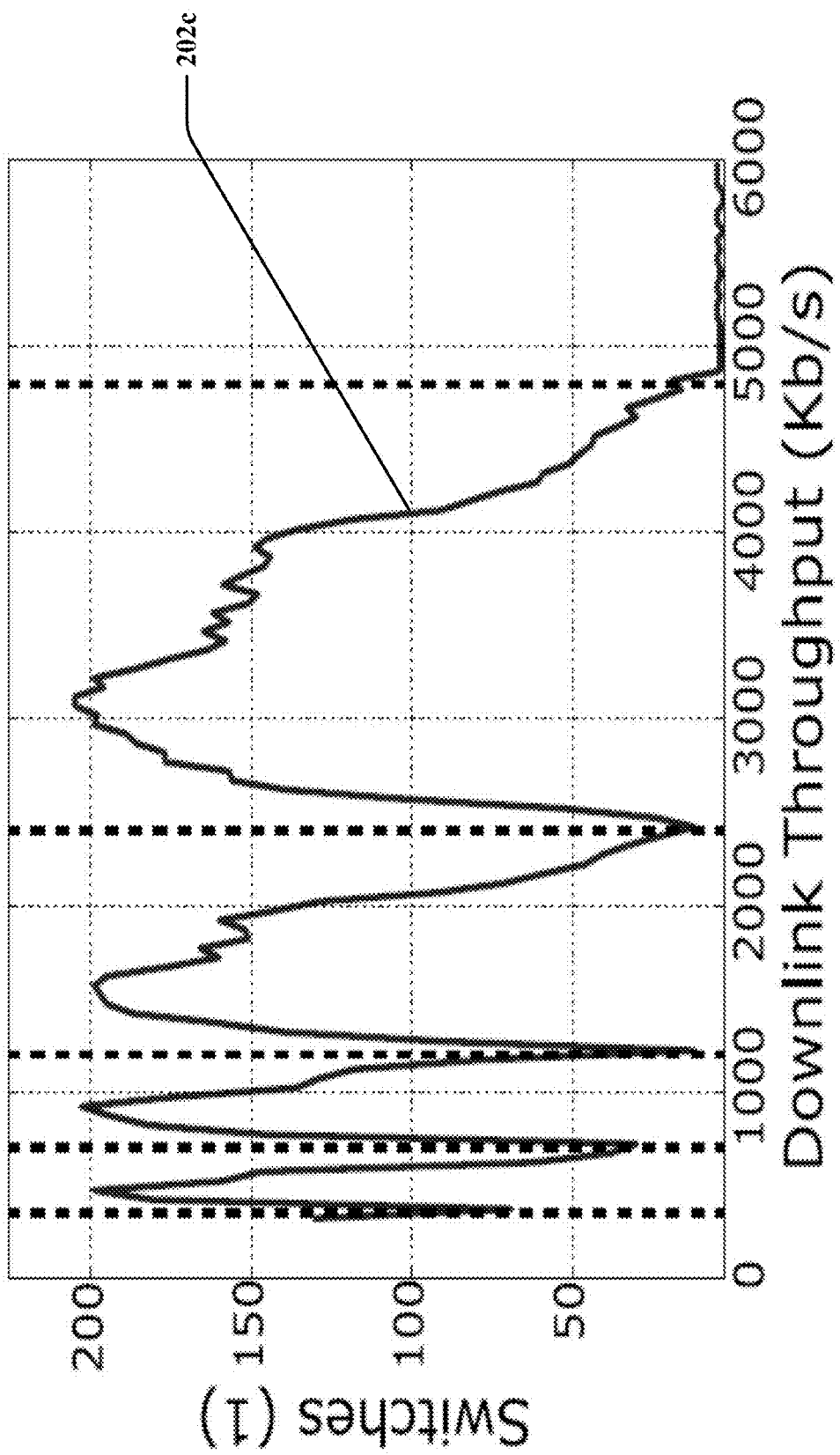
FIG. 2C is an exemplary illustration of a graph of a number of bitrate switches as a function of downlink throughput in accordance with various aspects described herein.

An unstable downlink throughput, which is common in cellular networks, can lead to fluctuation in average bitrate. FIG. 2C illustrates a plot 202c of bitrate switches relative to downlink throughput. The plot 202c indicates that providing downlink throughput at one of the bitrate candidates (see also FIG. 2B) yields a minimal number of bitrate switches. This is because an ABR algorithm maydetermine the bitrate level of requesting video chunks based on the downlink throughput. Unstable downlink throughput between two bitrate candidates can cause the ABR algorithm to oscillate in bitrate levels of requesting chunks, and lead to poor video QoE.

In short, to support good QoE, network/service providers/operators may maintain streaming video application downlink throughput at one of the application's bitrate candidates. This may require providers/operators to know bitrate candidates that are used by each application in advance. Fortunately, many content originators/providers use common bitrates candidates as recommended by HTTP Live Streaming (HLS). In some embodiments, bitrate candidates may be obtained/identified/determined based on parsing an application manifest. For example, when a client/user device requests content from, e.g., a content provider, the content provider may provide the user device with a manifest file that describes available bitrates for the user device to choose/select.

To limit the negative impact on regular/non-premium applications, SHADE may limit the resources (e.g., PRBs) that can be used by a fraction p of the total resources. As a first-order approximation, an assumption may be made that premium applications pay the same price for service/content. Thus, a simple threshold-based admission control mechanism (e.g., admission control component 214a of FIG. 2A) may be used to determine whether to assign premium status/membership to a given application. For example, a prospective application (e.g., application 202a of FIG. 2A) may be assigned premium status if at least some previously chosen threshold bitrate RAC can be provided to all admitted premium applications, inclusive of the prospective application, where the threshold $R_{AC}$ is selected among bitrate candidates. In some embodiments, the higher the value of $R_{AC}$, the more conservative SHADE may be when SHADE determines whether to admit a new premium application. Conversely, a lower value of $R_{AC}$ may increase the likelihood/probability that a prospective application will be assigned premium status.

For a given application assigned premium status, SHADE may select a bitrate from a set of candidate bitrates. To provide an enhanced QoE for premium applications, SHADE may strive to increase (e.g., maximize) overall bitrates under at least three constraints. First, for a given premium application $A_k$, SHADE may provide at least a bitrate $R_{k,1}$, where $R_{k,j}$ is the $j^{th}$ candidate bitrate for premium application $A_k$ and $R_{k,1}$ is the lowest bitrate candidate for application $A_k$. Second, whenever possible, a higher bitrate should be provided to reduce the re-buffering ratio. For example, and in accordance with the description above, a bitrate above 700 Kbps may yield a re-buffering ratio that approaches zero. Third, an application's associated channel conditions may change. Thus, SHADE may need to adapt bitrate selections accordingly. Conventional bitrate optimization algorithms may tend to favor applications with good channel conditions, and thus, such algorithms may tend to favor different applications over time and lead to unstable bitrate selections. As described above, e.g., in conjunction with FIG. 2C, unstable bitrate selections can lead to poor QoE. Accordingly, it may be important for SHADE to stabilize bitrate selection for premium applications over time.

SHADE may, at least initially, select a bitrate for each premium application independently, and allocate a similar amount of resources to the application over time, regardless of other applications' channel condition changes. There are a number of techniques that may be applied to determine how many (fixed) resources each application should be allocated/assigned initially. For example, an initial amount/quantity of PRBs may be determined in accordance with a pricing model to increase (e.g., maximize) profit or revenue. Without loss of generality, SHADE may (initially) allocate each premium application with a "fair share" (F) of resources. The fair share F may be expressed in accordance with equation #3 as follows:

$$F = p*T/N \qquad \text{equation \#3}$$

where p represents the fraction of total resources allocated to premium applications as described above, T represents the total number of resources that are available for all applications (premium and regular/non-premium), and N is the number of premium applications.

Figure 2D:
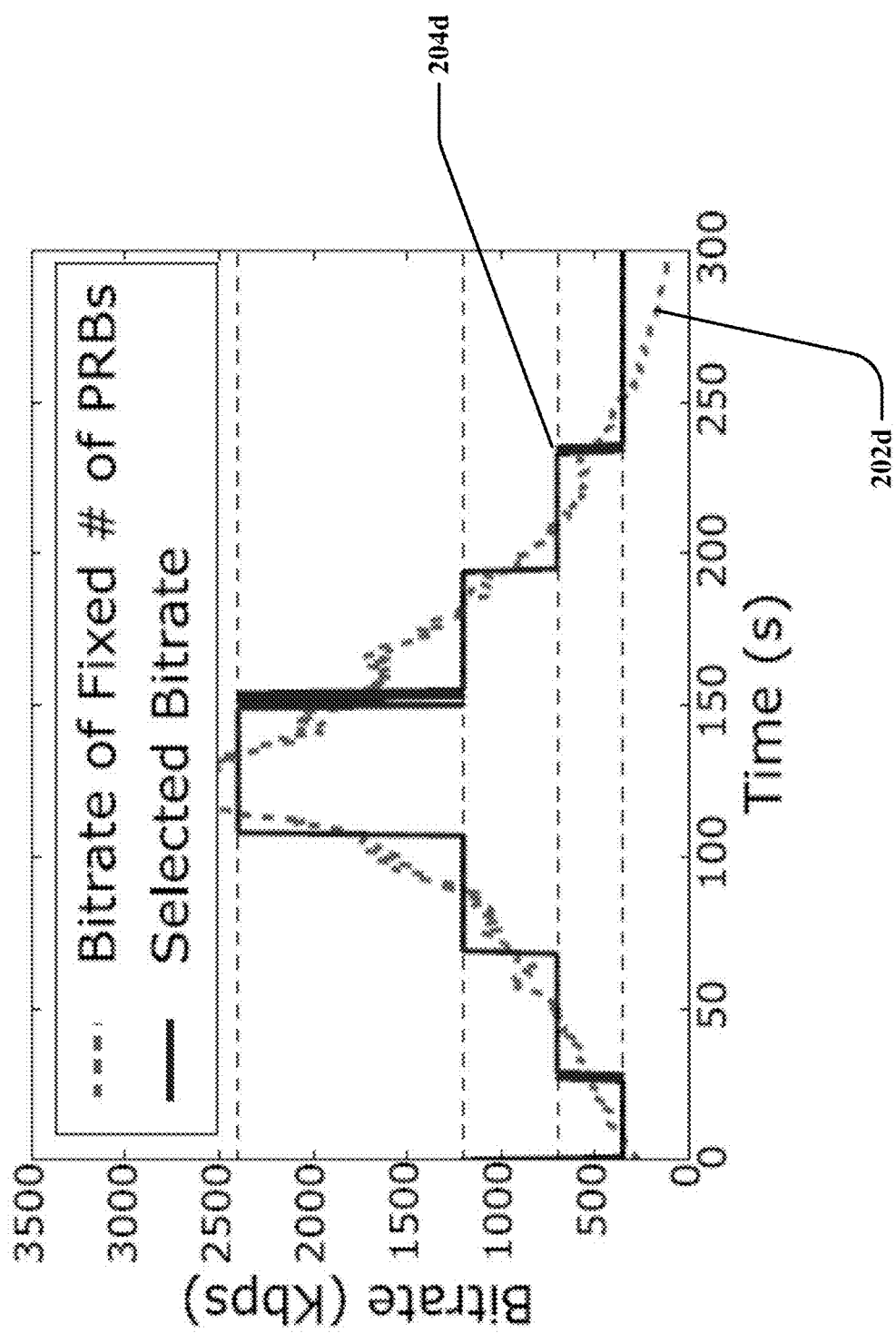
FIG. 2D is an exemplary illustration of a graph of a bitrates as a function of time in accordance with various aspects described herein.

For a given premium application, SHADE may first use equation #3 to calculate/estimate the achievable bitrate based on the application's current channel condition. Referring to FIG. 2D, this estimate is shown via plot 202d and may be referred to as bitrate of fixed # of PRBs (when the resource in question pertains to PRBs). The fluctuation in the plot 202d may be due at least in part to changes in channel conditions. SHADE may then map the bitrate represented by the plot 202d to the closest bitrate candidate that requires minimum resource (e.g., PRB) adjustment as reflected by the plot 204d (denoted as selected bitrate in FIG. 2D).

For a given application $A_i$ and its bitrate candidates $R_{i,1}, \ldots, R_{i,rb}, \ldots$, where bitrates equal to or greater than $R_{i,rb}$ yield a re-buffering ratio of zero (or, more generally, a re-buffering ratio that is less than a threshold), SHADE may first attempt to select a bitrate that is greater than or equal to $R_{i,rb}$ in order to minimize the re-buffering ratio. However, this may lead to use of more than p portions of resources (e.g., PRBs) for all premium applications. When the use of resources by premium applications would otherwise exceed p, SHADE may keep downgrading currently selected bitrates of premium application to lower bitrates to save resources until the total resources used by the premium applications is less than or equal to p.

Figure 2F:
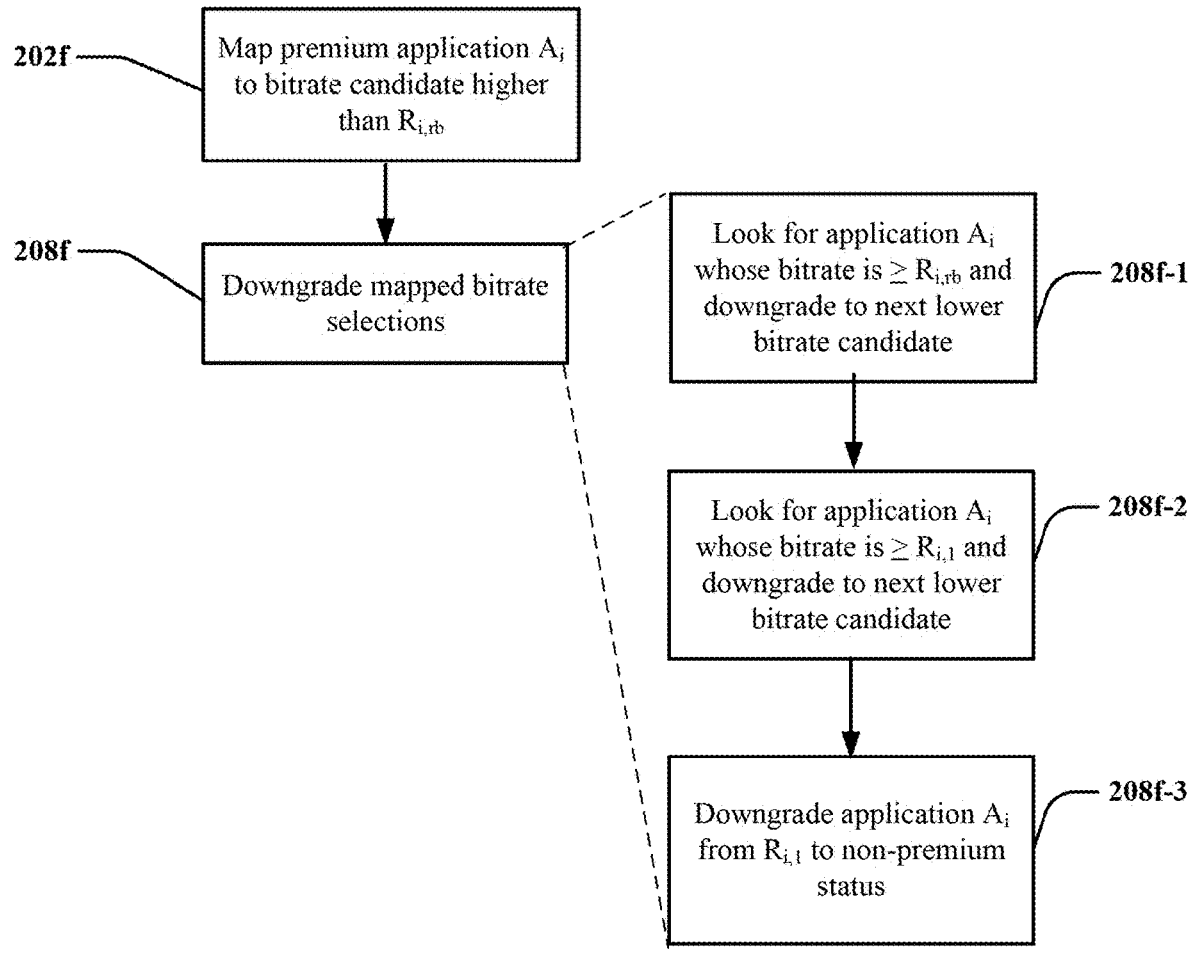
FIG. 2F depicts an illustrative embodiment of a method for selecting a bitrate in accordance with various aspects described herein.

Referring to FIG. 2E and FIG. 2F, an algorithm 200e and a flowchart of a method 200f are shown, respectively. The algorithm 200e/method 200f may be implemented by SHADE to select a bitrate for an application.

In lines 1-4 of the algorithm 200e (see also block 202f of the method 200f, SHADE may map a premium application $A_i$ to one of its bitrate candidates that is higher than $R_{i,rb}$.

In lines 5-19 of the algorithm 200e (see also block 208f of the method 200f, and the sub-blocks 208f-1 through 208f-3 of block 208f described below), SHADE downgrades mapped bitrate selections in three steps: (i) SHADE keeps looking for premium application $A_i$ whose selected bitrate is greater than or equal to $R_{i,rb}$ and downgrades it to its next lower bitrate candidate (lines 6-10 of the algorithm 200e; block 208f-1 of the method 200f); (ii) when there is no such application identified in accordance with (i), SHADE keeps looking for a premium application $A_i$ whose selected bitrate is greater than or equal to $R_{i,1}$, and downgrades it to the next lower bitrate candidate (lines 11-15 of the algorithm 200e; block 208f-2 of the method 200f); (iii) when there is no such application identified in accordance with (ii), SHADE downgrades premium application $A_i$ from $R_{i,1}$ to regular/non-premium status (lines 16-19 of the algorithm 200e; block 208f-3 of the method 200f).

The downgrading described above in connection with lines 5-19 of the algorithm 200e/block 208f of the method 200f may be used to ensure that SHADE supports a bitrate of at least $R_{i,1}$, and more preferably at least $R_{i,rb}$, for every premium application $A_i$ whenever possible. Additionally, in each downgrading operation, all other things being equal SHADE may downgrade the application that has the worst channel conditions first.

The algorithm 200e/method 200f may be executed periodically and/or in response to changing network conditions. For example, the algorithm 200e/method 200f may be executed as part of an interrupt service routine that may be triggered based on one or more monitored conditions.

As described above, SHADE may apply a weight parameter to the PF scheduler to maintain downlink throughput for premium applications. While providing for both good efficiency and fairness, experimentation has demonstrated that a PF scheduler can achieve at least 1.8 times of average throughput compared to a round robin schedule. In particular, the PF scheduler may achieve excellent fairness over time intervals that are approximately greater than one second.

As described above, as an initial estimate a given application may initially be assigned T/N resources (e.g., PRBs), where T is the total number of resources and N is the total number of applications. Allocating more resources to a given premium application than its fair share can be achieved by assigning a weight W, where the application will get roughly W times of its fair share. As such, the number of resources P allocated to the application will be in accordance with equation #4 shown below:

$$P = (W^*T)/(N+W-1) \qquad \text{equation \#4}$$

As the total number of resources T is a known parameter to network/service operators/providers, the parameter W in equation #4 may be tuned to control the amount of resources assigned to a given (premium) application.

SHADE may achieve a target throughput for a given premium application in two steps. First, SHADE may determine the number of resources (e.g., PRBs) required to achieve the targeted throughput at a given time instant. Second, SHADE may determine a suitable/appropriate weight W to obtain the required number of resources.

In terms of a determination of a number of resources to achieve a targeted throughput, an application's achievable throughput per resource (denoted as r) depends on the application's channel conditions, which is measured by a modulation and coding scheme (MCS) index (denoted as $I_{MCS}$). There may be a one-to-one mapping (e.g., function f) from the application's channel condition ($I_{MCS}$) to the achievable throughput per resource. Thus, the achievable throughput r may be expressed in accordance with equation #5 as follows:

$$r = f(I_{MCS}) \qquad \text{equation \#5}$$

The mapping may be specified by a transport block size index table and/or a transport block size table as would be appreciated by one of skill in the art.

To achieve the targeted throughput (denoted as V) for this premium application, SHADE may calculate the required number of resources (denoted by P) in accordance with equation #6 as follows:

$$P = V/r \qquad \text{equation \#6}$$

Substituting equation #5 into equation #6 yields equation #7 as follows:

$$P = V/f(I_{MCS}) \qquad \text{equation \#7}$$

SHADE may estimate the application's MCS Index ($I_{MCS}$) based on the past/historical MCS Indices for the application. One technique for generating such an estimate is to average the application's MCS Indices over a recent set of resources. However, in some instances, taking such an average may have a tendency to underestimate the MCS Index. The reason is that a small portion of resources may be allocated to this application, and the MCS Indices of these allocated resources may be much higher than the rest of the resources, as the PF scheduler may generally allocate resources with higher MCS Indices to this application. This means that SHADE may estimate the MCS Index (only) on resources that have (historically) been allocated to this application.

In terms of a determination of a suitable/appropriate weight W to obtain the required number of resources, re-arranging equation #4 yields the weight W in accordance with equation #8 as follows:

$$W = (P^*(N-1))/(T-P) \qquad \text{equation \#8}$$

Equation #8 may represent a first-order estimate for the weight W and may work well where all the applications are backlogged applications. As used herein, a backlogged application is an application that requires more resources than are allocated to the application. In many embodiments, there may be one or more non-backlogged applications that require a smaller number of resources than their fair shares. Letting Q(y) denote the required number of resources for a given non-backlogged application y, replacing T and N in equation #8 by T' and N', respectively, yields equation #9 and equation #10 as follows:

$$T' = T - \sum_{y \in \text{Non-Backlogged Applications}} Q(y) \qquad \text{equation \#9}$$

$$N' = |\text{Backlogged Applications}| \qquad \text{equation \#10}$$

Figure 2H:
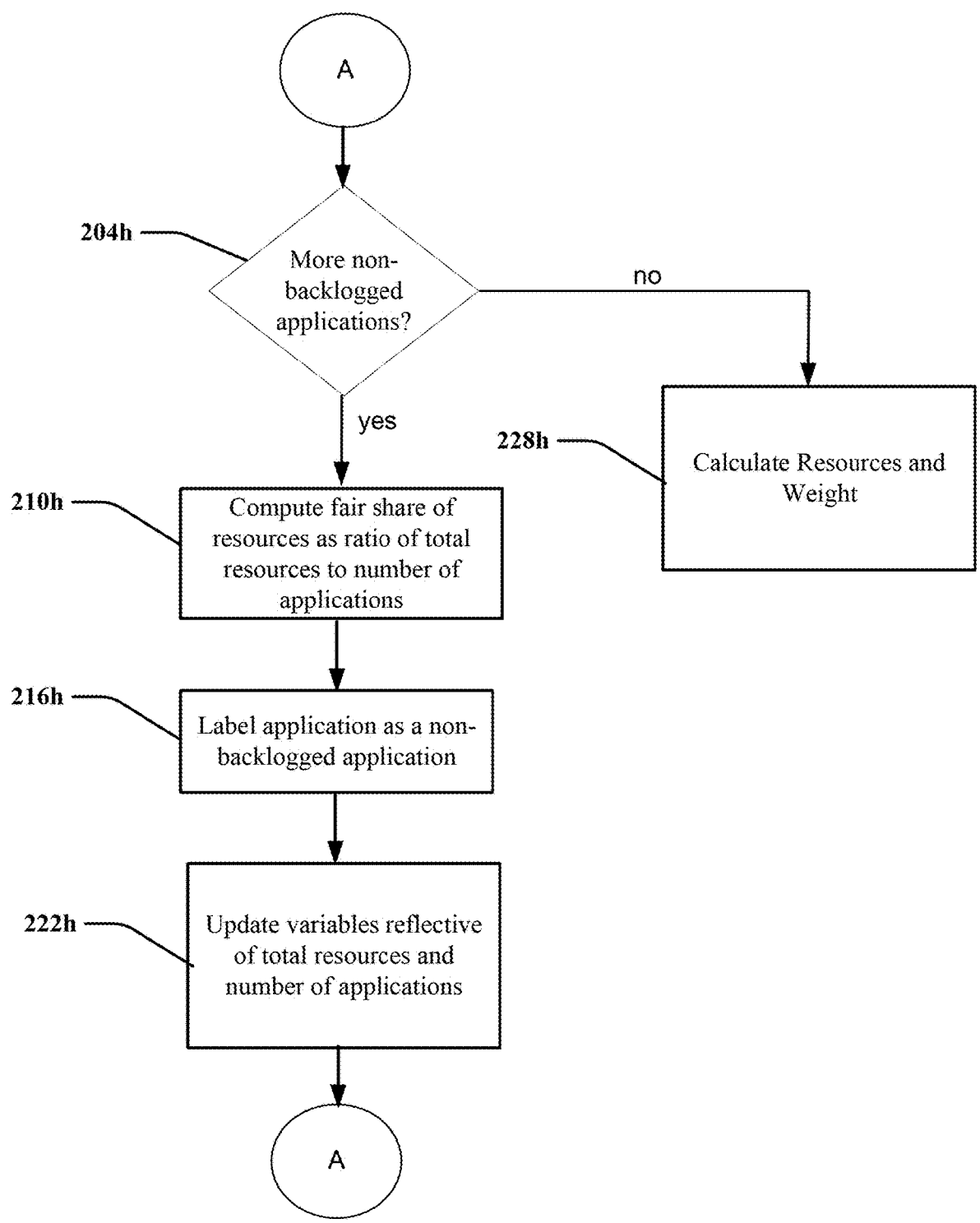
FIG. 2H depicts an illustrative embodiment of a method for calculating a weight parameter in accordance with various aspects described herein.

Thus, SHADE may need to determine the set of applications that are non-backlogged. SHADE may do so iteratively, as reflected by the algorithm 200g of FIG. 2G and the method 200h of FIG. 2H described further below. The algorithm 200g/method 200h may be used to calculate the weight W parameter for a premium application to achieve its target downlink throughput.

Initially, a determination may be made whether there are any new non-backlogged applications. For example, when there are no more new non-backlogged applications, such a condition may be referred to as having N' (which is a variable representing the number of applications) converged. See lines 1-3 of the algorithm 200g; see also block 204h of the method 200h.

Assuming that there are more non-backlogged applications (e.g., the yes path is taken from block 204h) the fair share F of resources for the application may be computed as the ratio of the total number of resources (T') to the number of applications (N') (see line 4 of the algorithm 200g; see also block 210h of the method 200h).

SHADE may label applications that require a smaller number of resources than the fair share F as non-backlogged applications (see lines 5-7 of the algorithm 200g; see also block 216h of the method 200h). Then, F may be updated accordingly using T' and N' in equation #9 (see lines 8, 9, and 4 in the algorithm 200g; see also block 222h of the method 200h).

This iterative process (e.g., the while loop of the algorithm 200g; the flow incorporating blocks 210h-222h of the method 200h) may keep updating T', N', and F until N' converges. Once N' converges (e.g., the while loop of the algorithm 200g is exited; the 'no' path is taken from block 204h of the method 200h), SHADE's scheduler may compute resources P in accordance with equation #7 above and the weight W based on the number of allocated resources to non-backlogged applications (see line 10 of the algorithm 200g; see also block 228h of the method 200h).

While for purposes of simplicity of explanation, the respective processes are shown and described as a series of blocks or operations in FIGS. 2E-2H, it is to be understood and appreciated that the claimed subject matter is not limited by the order of the blocks/operations, as some blocks/operations may occur in different orders and/or concurrently with other blocks/operations from what is depicted and described herein. Moreover, not all illustrated blocks/operations may be required to implement the methods described herein.

One skilled in the art will appreciate that the processes shown in FIGS. 2E-2H may be implemented as hardware, software, firmware, or a combination thereof. Moreover, the logic represented in FIGS. 2E-2H may be implemented in accordance with one or more programming languages at various levels of abstraction.

Due to changing conditions (e.g., changing radio conditions, changing traffic demands, etc.), the required resources Q(.) and the channel condition $I_{MCS}$ specified above may keep changing. Accordingly, SHADE may need to maintain throughput while adapting to network and user/application dynamics. For example, SHADE may use a reactive approach, where an update happens based upon a monitored/detected event/condition. In some embodiments, SHADE may utilize a proactive approach where updates happen periodically.

In some embodiments, network dynamics occurring at a small time granularity can be handled by an application (e.g., a streaming video application) itself. Thus, SHADE might not be burdened with the handling of such short-duration dynamics. For example, the computing resources associated with SHADE may tend to focus on dynamics that occur on a larger time scale/granularity. Providing such a focus may tend to limit the update frequency/rate at, e.g., a base station, thereby keeping the overhead associated with implementing SHADE low.

In some embodiments, SHADE may use two different time intervals, e.g., an MCS-Interval and a Requirement-Interval, to update $I_{MCS}$ and Q(.) (where Q(.) may also imply T and N), respectively. In particular, SHADE may utilize a shorter MCS-Interval to capture channel condition variation quickly, and a longer Requirement-Interval to accurately estimate applications' requirements.

In some embodiments, updates of the MCS-Interval and the Requirement-Interval may trigger an execution of the algorithm 200g (or, analogously, the method 200h). Such an execution may, in turn, serve to update the weight W for one or more applications.

The algorithm 200g (or, analogously, the method 200h) may be extended to calculate/determine multiple weights W to support multiple premium applications. To handle the dependency of resource allocation among premium applications, SHADE may (at least initially) treat all premium applications as a single virtual application. SHADE may determine this virtual premium application's weight using the algorithm 200 (or, the method 200h) first, and then distribute this weight among the premium applications in proportion to their resource (e.g., PRB) requirements. For example, if there are S premium applications, SHADE may create a virtual application $A_{virtual}$ with $P_{virtual}$ resources, where $P_{virtual}$ is computed as the sum of the resources P for each application 1 through S in accordance with equation #11 as follows:

$$P_{virtual}=P_1+P_2+P_3+\ldots P_S \qquad \text{equation \#11}$$

Similarly, the number of virtual applications $N_{virtual}$ may be computed as the number of application N less the number of premium applications S plus one as shown in equation #12:

$$N_{virtual}=N-S+1 \qquad \text{equation \#12}$$

After the algorithm 200g (or the method 200h) returns the weight $W_{virtual}$ for the application $A_{virtual}$, the $i^{th}$ premium applications's weight $W_i$ may be calculated as shown in equation #13:

$$W_i=W_{virtual}*(P_i/P_{virtual}) \qquad \text{equation \#13}$$

where (i=1, 2, . . . , S).

Aspects of this disclosure may facilitate an allocation of resources amongst a plurality of applications, users, components, devices, or a combination thereof. In some embodiments, and potentially in accordance with one or more of the algorithms or methods described herein, a first plurality of applications may be designated with a first status and a second plurality of application may be designated with a second status that is different from the first status. For example, the first status may include a premium status and the second status may include a regular/non-premium status. While two statuses are described in this example, more than two statuses may be used in some embodiments.

In some embodiments, a bitrate may be selected for an application amongst a set of candidate bitrates. The selection of a bitrate for an application may be based on one or more thresholds. For example, a first threshold may be associated with a re-buffering of content and a second threshold may be associated with a status that differentiates the status of the application from other statuses.

In some embodiments, resources may be allocated to one or more applications on the basis of a weight parameter. The weight that is assigned for each application may be based on a total number of resources included in a first subset of resources, a total number of applications included in a first plurality of applications, a target throughput of the application, a channel condition associated with the application, an identification of non-backlogged applications included in the first plurality of applications, or a combination thereof.

In some embodiments, resource allocations (e.g., PRBs, bitrates, etc.) may be updated dynamically in response to changing/updated conditions. The resource allocation may leverage an NGBR/best-effort service in an effort to maximize efficiency while avoiding imposing excessive strain on network resources. Moreover, the resource allocation may promote fairness, at least insofar as regular/non-premium member applications may still receive a reasonable (e.g., above a threshold) amount of resources to facilitate a QoE. In some embodiments, an application may be reassigned a status, e.g., an application with a first status may be reassigned a second status, and vice versa. Resources allocated to that application may change based on the reassignment of the status.

Aspects of the disclosure may allocate resources in accordance with one or more parameters. For example, and in addition to the parameters/considerations described above, resources may be allocated based on actual or predicted user demands (which may incorporate considerations pertaining to the time of day or day of week, user schedules/calendars, user locations, etc.).

In some embodiments, resource allocation may be based on a user profile. The user profile may take into consideration a user's history, such as for example a log of media or content that has been accessed by the user. In some embodiments, a user's email, messages (e.g., SMS or text messages), social media activity, etc., may be consulted in an effort to predict resources that may be needed by a user. In some embodiments, resource allocation may be based on a capability associated with a user device. For example, resource allocation may be based on a buffer/memory capacity associated with the user device, a display capability associated with the user device, etc.

In some embodiments, a computing device (e.g., a user/client device, a base station controller, etc.) may apply a filtering scheme/technique in order to avoid excessive switching between resources. The avoidance of such switching except when necessary may help to smooth/regulate network performance over time, thereby helping to maximize profits or revenue for a network/service provider/operator.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of system/workflow 200a, the algorithms 200e and 200g, and the methods 200f and 200h presented in FIGS. 1, 2A, and 2E-2H. For example, a virtualized communication network 300 can facilitate in whole or in part designating a first plurality of applications as premium applications and a second plurality of applications as non-premium applications, allocating a first subset of resources to the first plurality of applications and a second subset of the resources to the second plurality of applications, and selecting a respective bitrate for each application of the first plurality of applications. In some embodiments, the selection of the respective bitrate for each application of the first plurality of applications is based on a first threshold associated with a re-buffering of content, a second threshold associated with a status that differentiates the premium applications from the non-premium applications, or a combination thereof.

In some embodiment, the virtualized communication network 300 can facilitate in whole or in part determining a weight to be applied to each application of the first plurality of applications such that each application is allocated a respective share of resources included in the first subset of resources. In some embodiments, the determining of the weight for each application is based on a total number of resources included in the first subset of resources, a total number of applications included in the first plurality of applications, a target throughput of the application, a channel condition associated with the application, an identification of non-backlogged applications included in the first plurality of applications, or a combination thereof.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
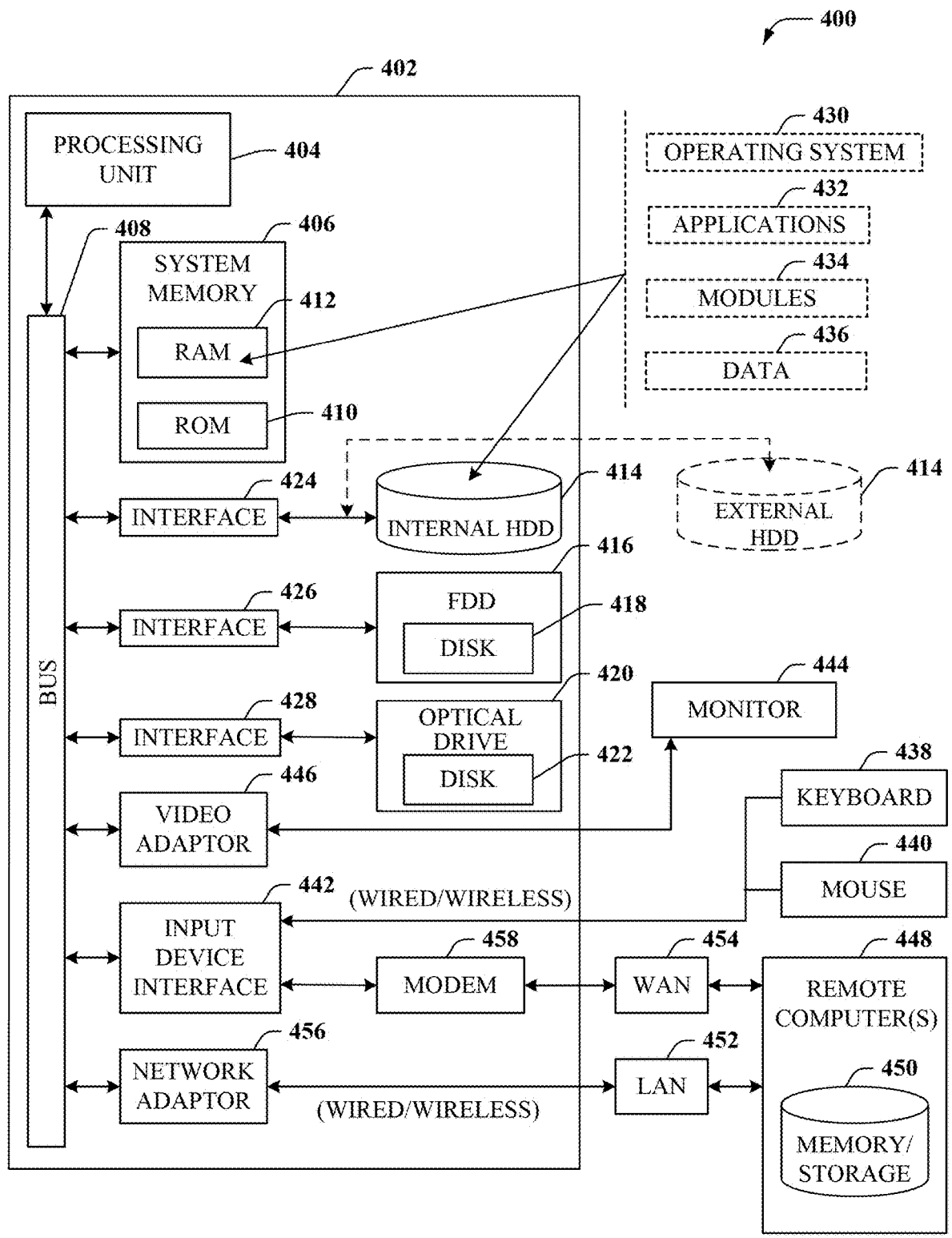
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part designating a first plurality of applications as premium applications and a second plurality of applications as non-premium applications, allocating a first subset of resources to the first plurality of applications and a second subset of the resources to the second plurality of applications, and selecting a respective bitrate for each application of the first plurality of applications. In some embodiments, the selection of the respective bitrate for each application of the first plurality of applications is based on a first threshold associated with a re-buffering of content, a second threshold associated with a status that differentiates the premium applications from the non-premium applications, or a combination thereof. Moreover, the computing environment can facilitate in whole or in part determining a weight to be applied to each application of the first plurality of applications such that each application is allocated a respective share of resources included in the first subset of resources. In some embodiments, the determining of the weight for each application is based on a total number of resources included in the first subset of resources, a total number of applications included in the first plurality of applications, a target throughput of the application, a channel condition associated with the application, an identification of non-backlogged applications included in the first plurality of applications, or a combination thereof.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM),flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
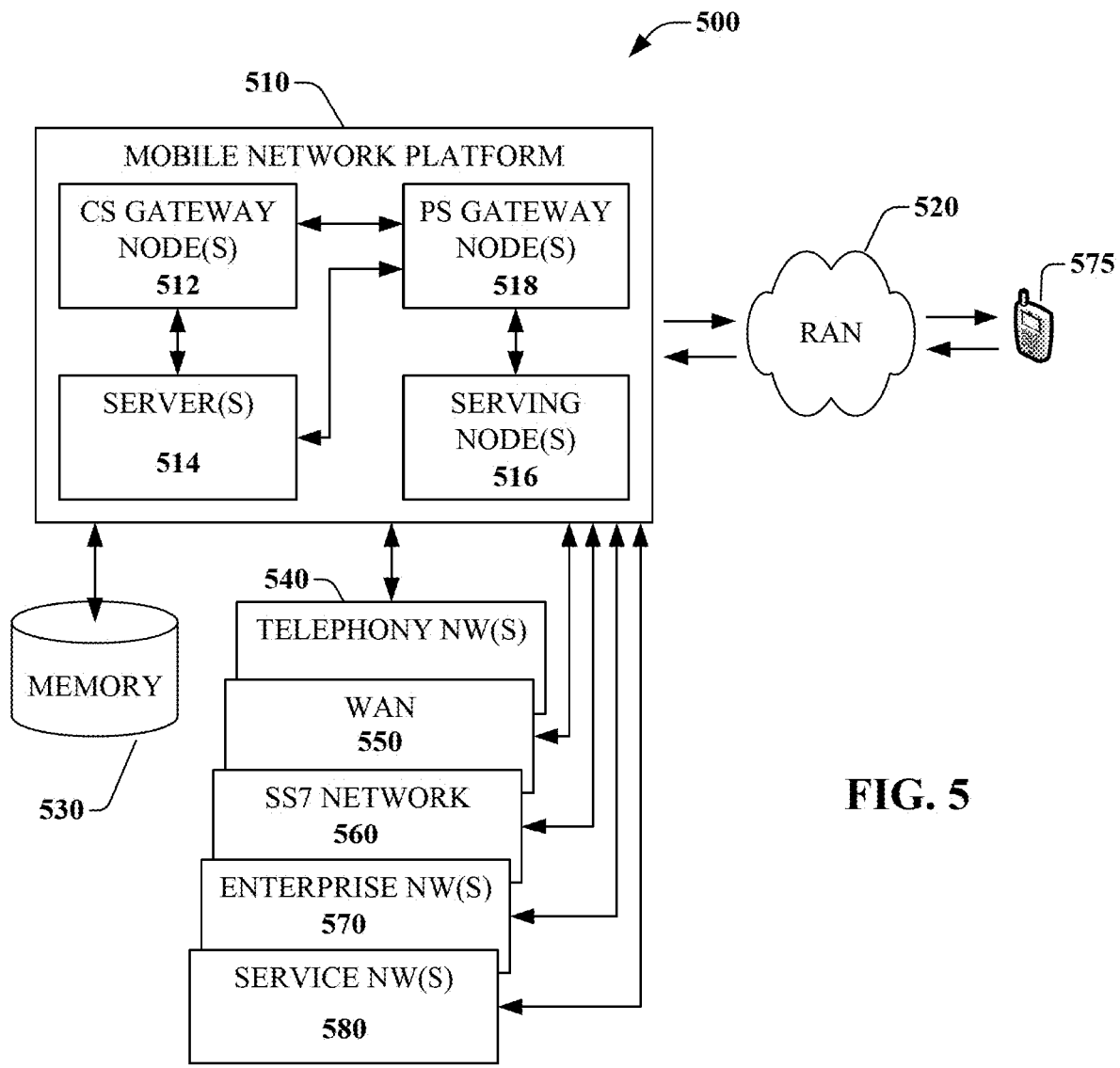
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part designating a first plurality of applications as premium applications and a second plurality of applications as non-premium applications, allocating a first subset of resources to the first plurality of applications and a second subset of the resources to the second plurality of applications, and selecting a respective bitrate for each application of the first plurality of applications. In some embodiments, the selection of the respective bitrate for each application of the first plurality of applications is based on a first threshold associated with a re-buffering of content, a second threshold associated with a status that differentiates the premium applications from the non-premium applications, or a combination thereof. The platform 510 can facilitate in whole or in part determining a weight to be applied to each application of the first plurality of applications such that each application is allocated a respective share of resources included in the first subset of resources. In some embodiments, the determining of the weight for each application is based on a total number of resources included in the first subset of resources, a total number of applications included in the first plurality of applications, a target throughput of the application, a channel condition associated with the application, an identification of non-backlogged applications included in the first plurality of applications, or a combination thereof.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
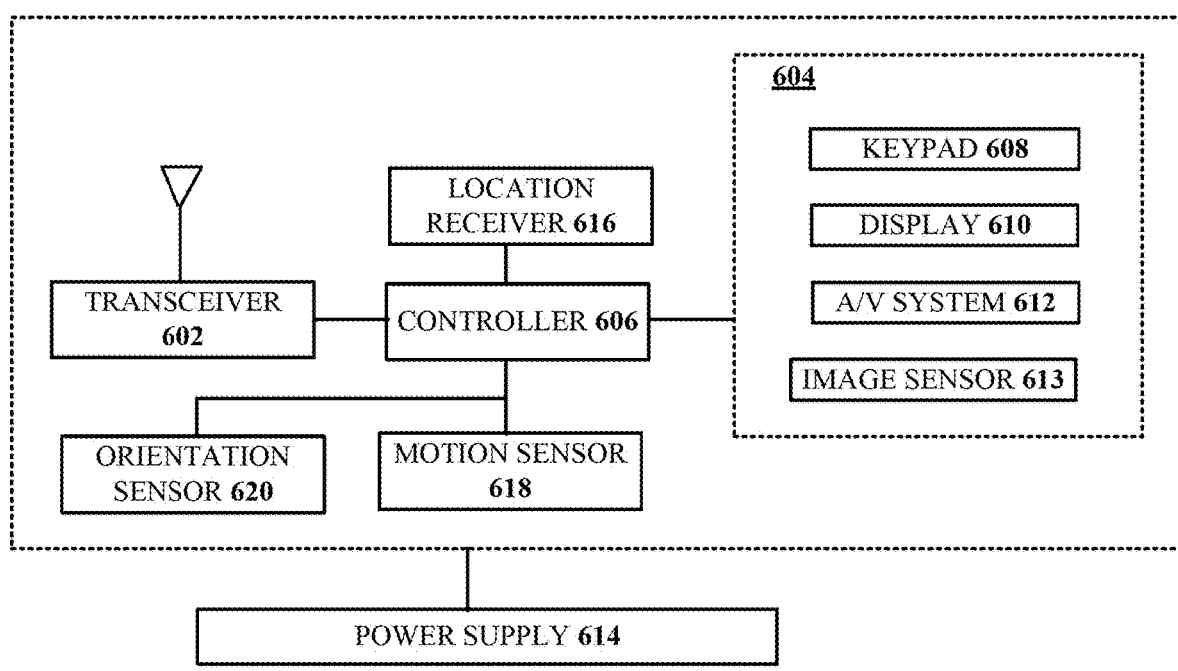
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part designating a first plurality of applications as premium applications and a second plurality of applications as non-premium applications, allocating a first subset of resources to the first plurality of applications and a second subset of the resources to the second plurality of applications, and selecting a respective bitrate for each application of the first plurality of applications. In some embodiments, the selection of the respective bitrate for each application of the first plurality of applications is based on a first threshold associated with a re-buffering of content, a second threshold associated with a status that differentiates the premium applications from the non-premium applications, or a combination thereof. The computing device 600 can facilitate in whole or in part determining a weight to be applied to each application of the first plurality of applications such that each application is allocated a respective share of resources included in the first subset of resources. In some embodiments, the determining of the weight for each application is based on a total number of resources included in the first subset of resources, a total number of applications included in the first plurality of applications, a target throughput of the application, a channel condition associated with the application, an identification of non-backlogged applications included in the first plurality of applications, or a combination thereof.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)=confidence(class)$. Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
    a processing system including a processor; and
    a memory that stores executable instructions that, when executed by the processing system, facilitate performance of operations, the operations comprising:
    assigning a first status to a first plurality of applications and assigning a second status to a second plurality of applications, wherein the second status is different from the first status;
    allocating, based on the first status, a first plurality of resources to the first plurality of applications;
    receiving a request for an application included in the second plurality of applications to be reassigned with a status corresponding to the first status;
    responsive to receiving the request, determining whether there is capacity in the first plurality of resources that is above a threshold; and
    based on determining that there is capacity in the first plurality of resources that is above the threshold, reassigning the application with the status corresponding to the first status, resulting in an updated first plurality of applications that comprises the first plurality of applications and the application,
    wherein the allocating of the first plurality of resources to the first plurality of applications comprises allocating at least one physical resource block to each application of the first plurality of applications based on:
        a ratio of an achievable rate by the application of the first plurality of applications when using the at least one physical resource block,
        an average data rate associated with the application of the first plurality of applications over a time interval in the past, and
        a weight parameter.

2. The device of claim 1, wherein the operations further comprise:
    selecting a bitrate for each application included in the updated first plurality of applications.

3. The device of claim 2, wherein the operations further comprise:
    maintaining a throughput of respective flows associated with each application of the updated first plurality of applications based on the bitrate for each application included in the updated first plurality of applications,
    wherein the selecting comprises selecting the bitrate for each application included in the updated first plurality of applications in accordance with a non-guaranteed bit rate traffic class.

4. The device of claim 2, wherein the selecting is based on a re-buffering ratio associated with each application included in the updated first plurality of applications.

5. The device of claim 1, wherein the first plurality of applications comprises a streaming video application that provides panoramic content.

6. The device of claim 1, wherein the weight parameter is based on:
    a first count of the first plurality of resources and a second count of a second plurality of resources allocated to the second plurality of applications, wherein the second plurality of resources are allocated to the second plurality of applications based on the second status.

7. A non-transitory machine-readable medium, comprising executable instructions that, when executed by a processing system including a processor, facilitate performance of operations, the operations comprising:
assigning a first bitrate to an application included in a plurality of applications, wherein the first bitrate is associated with a transmission of data in a network;
detecting a change in a channel condition of the network;
responsive to the detecting of the change in the channel condition, determining whether the first bitrate is greater than or equal to a first threshold, wherein the first threshold is associated with a re-buffering of a playback of the data at a user device;
responsive to determining that the first bitrate is greater than or equal to the first threshold, reassigning the application with a second bitrate that is less than the first bitrate;
determining a number of physical resource blocks to assign to the application to obtain a throughput for the application that is greater than or equal to a second threshold;
determining a weight parameter to obtain the number of physical resource blocks for the application; and
assigning the weight parameter to the application.

8. The non-transitory machine-readable medium of claim 7, wherein the operations further comprise:
responsive to determining that the first bitrate is not greater than or equal to the first threshold, determining whether a third bitrate assigned to a second application included in the plurality of applications is greater than or equal to a second threshold; and
responsive to determining that the third bitrate assigned to the second application is greater than or equal to the second threshold, reassigning the second application with a fourth bitrate that is less than the third bitrate.

9. The non-transitory machine-readable medium of claim 7, wherein the operations further comprise:
responsive to determining that the first bitrate is not greater than or equal to the first threshold, determining whether the first bitrate is greater than or equal to a second threshold, wherein the second threshold is associated with a status of each application included in the plurality of applications; and
responsive to determining that the first bitrate is greater than or equal to the second threshold, reassigning the application with a third bitrate that is less than the second bitrate.

10. The non-transitory machine-readable medium of claim 9, wherein the operations further comprise:
responsive to determining that the first bitrate is not greater than or equal to the second threshold, determining whether a fourth bitrate assigned to a second application included in the plurality of applications is greater than or equal to the second threshold; and
responsive to determining that the fourth bitrate assigned to the second application is greater than or equal to the second threshold, reassigning the second application with a fifth bitrate that is less than the fourth bitrate.

11. The non-transitory machine-readable medium of claim 9, wherein the operations further comprise:
responsive to determining that the first bitrate is not greater than or equal to the second threshold, reassigning the application with a second status that is different from the status,
wherein the reassigning of the application with the second status comprises reassigning the application with a fourth bitrate that is less than the third bitrate.

12. The non-transitory machine-readable medium of claim 7, wherein the detecting of the change in the channel condition comprises detecting an increase in data traffic of a communication channel of the network.

13. The non-transitory machine-readable medium of claim 7, wherein the determining of the number of physical resource blocks to assign to the application is based on a ratio of the second threshold and a modulation and coding scheme index, wherein the modulation and coding scheme index is based on a historical allocation of physical resource blocks to the application.

14. The non-transitory machine-readable medium of claim 13, wherein the determining of the weight parameter is based on:
a total number of physical resource blocks supported by the network for the plurality of applications,
a total number of applications that are included in the plurality of applications, and
an identification of at least one application included in the plurality of applications that is non-backlogged such that the at least one application utilizes less than its respective fair share of the total number of physical resource blocks based on a status that is assigned to the at least one application.

15. A method, comprising:
allocating, by a processing system including a processor, a first subset of resources to a first plurality of applications and a second subset of the resources to a second plurality of applications, wherein the allocating is based on respective statuses associated with the first plurality of applications and the second plurality of applications;
determining, by the processing system, a respective weight to be applied to each application of the first plurality of applications such that each application is allocated a respective share of resources included in the first subset of resources; and
assigning, by the processing system, a respective bitrate to each application of the first plurality of applications;
wherein the assigning of the respective bitrate to each application of the first plurality of applications is based on:
a first threshold associated with a re-buffering of content; and
a second threshold associated with the statuses, and
wherein the determining of the respective weight for each application is based on:
a total number of resources included in the first subset of resources;
a total number of applications included in the first plurality of applications;
a target throughput of the application;
a channel condition associated with the application; and
an identification of at least one non-backlogged application included in the first plurality of applications.

16. The method of claim 15, further comprising:
applying the respective weight to each application of the first plurality of applications, wherein the first subset of resources comprises a first plurality of physical resource blocks, and wherein the applying of the respective weight to each application of the first plurality of applications allocates a respective share of the first plurality of physical resource blocks to each application of the first plurality of applications.

17. The method of claim 16, wherein the second subset of the resources comprises a second plurality of physical resource blocks, wherein the allocating of the first subset of resources to the first plurality of applications is based on user profiles associated with user devices that execute the first plurality of applications, capabilities associated with the user devices, and locations of the user devices when the user devices are executing the first plurality of applications, wherein at least one of the user profiles includes a specification of a social media activity, and wherein at least one of the capabilities associated with the user devices includes a specification of a buffer capacity, a specification of a display device capability, or a combination thereof, the method further comprising:

receiving, by the processing system, a manifest for a first application included in the first plurality of applications, wherein the manifest includes a plurality of candidate bitrates for the first application, wherein the assigning comprises selecting from the manifest a first bitrate for the first application from the plurality of candidate bitrates.

18. The device of claim 6, wherein the weight parameter is further based on:

a total number of applications that are included in the first plurality of applications and the second plurality of applications.

19. The device of claim 18, wherein the weight parameter is further based on:

an identification of at least one application included in the first plurality of applications that is non-backlogged.

20. The device of claim 5, wherein the receiving of the request comprises receiving the request from the application included in the second plurality of applications.

* * * * *

UNITED STATES PATENT AND TRADEMARK OFFICE
CERTIFICATE OF CORRECTION

PATENT NO. : 10,819,760 B2
APPLICATION NO. : 16/148288
DATED : October 27, 2020
INVENTOR(S) : Jia Wang et al.

Page 1 of 1

It is certified that error appears in the above-identified patent and that said Letters Patent is hereby corrected as shown below:

On the Title Page

Assignees, "University of South Carolina" should be --University of Southern California--.

Signed and Sealed this
Eighth Day of December, 2020

Andrei Iancu
*Director of the United States Patent and Trademark Office*